United States Patent [19]

MacIntyre et al.

[11] Patent Number: 5,135,845
[45] Date of Patent: Aug. 4, 1992

[54] SENSITIZING DYE FOR PHOTOGRAPHIC MATERIALS

[75] Inventors: Gladys L. MacIntyre, Clyde; Richard L. Parton, Webster; Wayne W. Weber, II, Honeoye Falls, all of N.Y.

[73] Assignee: Eastman Kodak Company, Rochester, N.Y.

[21] Appl. No.: 506,746

[22] Filed: Apr. 10, 1990

[51] Int. Cl.$^5$ .............................................. G03C 1/18
[52] U.S. Cl. ..................................... 430/585; 430/588
[58] Field of Search ................................. 430/585, 588

[56] References Cited

U.S. PATENT DOCUMENTS

| | | | |
|---|---|---|---|
| 3,196,017 | 7/1965 | Gotze | 430/588 |
| 3,264,110 | 8/1966 | Depoorter et al. | 96/106 |
| 3,268,334 | 8/1966 | Depoorter et al. | 96/106 |
| 3,769,025 | 10/1973 | Ohkubo et al. | 430/588 |
| 4,026,707 | 5/1977 | Obikawa et al. | 96/95 |
| 4,387,155 | 6/1983 | Hill et al. | 430/217 |
| 4,510,235 | 4/1985 | Ukai et al. | 430/574 |
| 4,571,380 | 2/1986 | Noguchi et al. | 430/589 |
| 4,753,868 | 6/1988 | Goda et al. | 430/393 |
| 4,789,626 | 12/1988 | Sakanoue et al. | 430/393 |

FOREIGN PATENT DOCUMENTS 1180241 10/1964 Fed. Rep. of Germany.
2454357 5/1975 Fed. Rep. of Germany.

Primary Examiner—Charles L. Bowers, Jr.
Assistant Examiner—Janet C. Baxter
Attorney, Agent, or Firm—Gordon M. Stewart

[57] ABSTRACT

Sensitizing dyes for photographic materials are disclosed. The dyes have the formula:

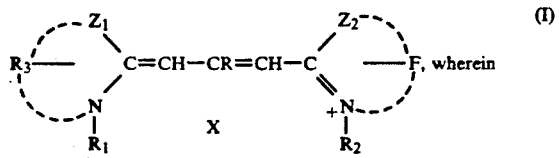

$Z_1$ represents the atoms necessary to complete a benzoxazole nucleus, a benzothiazole nucleus, a benzoselenazole nucleus, a benzotellurazole nucleus, or a benzimidazole nucleus, which, in addition to being substituted by $R_3$, may be further substituted or unsubstituted, $Z_2$ represents the atoms necessary to complete a benzoxazole nucleus, a benzothiazole nucleus, a benzoselenazole nucleus, a benzotellurazole nucleus, or a benzimidazole nucleus, which, in addition to being substituted by F, may be further substituted or unsubstituted, R represents H or substituted or unsubstituted alkyl or aryl, $R_1$ and $R_2$ each independently represents substituted or unsubstituted alkyl or aryl, $R_3$ represents an aryl group that may be appended to or fused with $Z_1$, and X is a counterion as needed to balance the charge of the molecule.

22 Claims, No Drawings

SENSITIZING DYE FOR PHOTOGRAPHIC MATERIALS

FIELD OF THE INVENTION

This invention relates to photography, and specifically to spectral sensitization of silver halide emulsions.

BACKGROUND OF THE INVENTION

Silver halide photography usually involves the exposure of silver halide with light in order to form a latent image that is developed during photographic processing to form a visible image. Silver halide is intrinsically sensitive only to light in the blue region of the spectrum. Thus, when silver halide is to be exposed to other wavelengths of radiation, such as green or red light in a multicolor element or infrared radiation in an infrared-sensitive element, a spectral sensitizing dye is required. Sensitizing dyes are chromophoric compounds (usually cyanine dye compounds) that are adsorbed to the silver halide. They absorb light or radiation of a particular wavelength and transfer the energy to the silver halide to form the latent image, thus effectively rendering the silver halide sensitive to radiation of a wavelength other than the blue intrinsic sensitivity.

Silver halide is often spectrally sensitized with certain trimethine cyanine dyes, also called carbocyanines. In order to provide high sensitivity and also to provide sensitivity at the proper wavelength of radiation, it is often desirable for the sensitizing dye molecules to aggregate when used to sensitize silver halide emulsions. Carbocyanines that form such aggregates are well-known in the art. One such known dye has the formula:

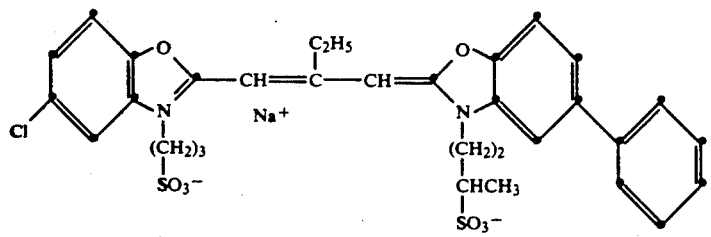

Dyes, such as the one shown above, although they form an aggregate such as a J-aggregate so as to provide high photographic sensitivity and good spectral absorbance characteristics, also suffer from the disadvantage that they tend to be retained in the layers of the photographic material after processing, leading to undesirable dye stain.

The prior art has generally used stain-reducing agents, such as bis-triazine stilbene compounds known as optical brighteners, in order to reduce this retained dye stain. These compounds, however, are expensive and can be difficult to incorporate in the hydrophilic layers in photographic materials.

On the other hand, dyes, such as:

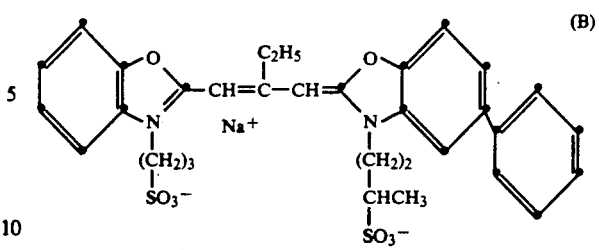

tend to have low stain, but do not aggregate to an extent sufficient to provide the desired spectral sensitivity to silver halide emulsions.

It is thus an object of this invention to spectrally sensitize silver halide photographic compositions with a carbocyanine dye that provides high sensitivity, yet also provides low stain while avoiding the necessity of using stain-reducing agents.

SUMMARY OF THE INVENTION

According to the invention, silver halide photographic compositions are spectrally sensitized with a dye according to the formula:

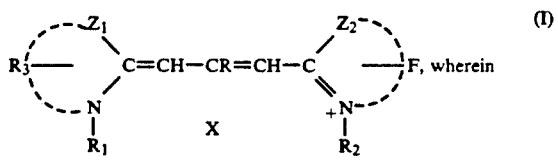

$Z_1$ represents the atoms necessary to complete a benzoxazole nucleus, a benzothiazole nucleus, a benzoselenazole nucleus, a benzotellurazole nucleus, or a benzimidazole nucleus, which, in addition to being substituted by $R_3$, may be further substituted or unsubstituted, $Z_2$ represents the atoms necessary to complete a benzoxazole nucleus, a benzothiazole nucleus, a benzoselenazole nucleus, a benzotellurazole nucleus, or a benzimidazole nucleus, which, in addition to being substituted by F, may be further substituted or unsubstituted, R represents H or substituted or unsubstituted alkyl or aryl, $R_1$ and $R_2$ each independently represents substituted or unsubstituted alkyl or aryl, $R_3$ represents an aryl group that may be appended to or fused with $Z_1$, and X is a counterion as needed to balance the charge of the molecule.

The dye of formula (I) provides effective spectral sensitization of silver halide photographic compositions, imparting good photographic speed, but exhibiting significantly less post-processing dye stain compared to dyes such as dye (A) above. Brightener compounds are not usually needed in order to maintain acceptably low levels of post-processing stain.

DESCRIPTION OF THE PREFERRED EMBODIMENTS

According to formula (I), $Z_1$ and $Z_2$ each independently represents the atoms necessary to complete a benzoxazole nucleus, a benzothiazole nucleus, a benzoselenazole nucleus, a benzotellurazole nucleus, or a benzimidazole nucleus, which, in addition to being substituted by $R_3$ or F, may be further substituted or unsubstituted.

Examples of nuclei useful as $Z_1$ and $Z_2$ include a benzothiazole nucleus, e.g., benzothiazole, 4-chlorobenzothiazole, 5-chlorobenzothiazole, 6-chlorobenzothiazole, 7-chlorobenzothiazole, 4-methyl-benzothiazole, 5-methylbenzothiazole, 6-methylbenzothiazole, 5-bromobenzothiazole, 6-bromobenzothiazole, 5-phenylbenzothiazole, 6-phenylbenzothiazole, 4-methoxybenzothiazole, 5-methoxybenzothiazole, 6-methoxybenzothiazole, 5-iodobenzothiazole, 6-iodobenzothiazole, 4-ethoxybenzothiazole, 5-ethoxybenzothiazole, 5-hydroxybenzothiazole, 6-hydroxybenzothiazole, or, when $R_3$ is fused with $Z_1$, a naphtho[2,1-d]thiazole, naptho[1,2-d]thiazole, 5-methoxynaphtho[2,3-d]thiazole, 5-ethoxynaphtho[2,3-d]thiazole, 8-methoxynaphtho[2,3-d]thiazole, 7-methoxy-naptho[2,3-d]thiazole; a benzoxazole nucleus, e.g., benzoxazole, 5-chlorobenzoxazole, a ethylbenzoxazole, 5-phenylbenzoxazole, 6-methylbenzoxazole, 4,6-dimethylbenzoxazole 5-ethoxybenzoxazole, 5-chlorobenzoxazole, 6-methoxybenzoxazole, 5-hydroxybenzoxazole, 6-hydroxybenzoxazole, or, when $R_3$ is fused with $Z_1$, a naphtho[2,1-d]oxazole, naphtho[1,2-d]oxazole, etc.; a benzoselenazole nucleus, e.g., benzoselenazole, 5-chlorobenzoselenazole, 5-methoxybenzoselenazole, 5-hydroxybenzoselenazole, or, when $R_3$ is fused with $Z_1$, a naphtho[2,1-d]selenazole, naphtho[1,2-d]selenazole, etc.; a benzotellurazole nucleus, e.g., benzotellurazole, naphtho[1,2-d]tellurazole 5,6-dimethoxytellurazole, 5-methoxytellurazole, 5-methyltellurazole; a benzimidazole nucleus, e.g., 1-methylbenzimidazole, 1-ethyl-benzimidazole, 1-methyl-5-chlorobenzimidazole, 1-ethyl-5-chlorobenzimidazole, 1-ethyl-5-fluorobenzimidazole, 1-allyl-5-chlorobenzimidazole, 1-phenylbenzimidazole, 1-phenyl-5-chlorobenzimidazole, 1-methyl-5-trifluorobenzimidazole, 1-ethyl-5-trifluoromethylbenzimidazole.

Also according to formula (I), $R_1$ and $R_2$ may be substituted or unsubstituted aryl (preferably of 6 to 15 carbon atoms), or more preferably, substituted or unsubstituted alkyl (preferably of from 1 to 6 carbon atoms). Examples of aryl include phenyl, tolyl, p-chlorophenyl, and p-methoxyphenyl. Examples of alkyl include methyl, ethyl, propyl, isopropyl, butyl, hexyl, cyclohexyl, decyl, dodecyl, etc., and substituted alkyl groups (preferably a substituted lower alkyl containing from 1 to 6 carbon atoms), such as a hydroxyalkyl group, e.g., β-hydroxyethyl, ω-hydroxybutyl, etc., an alkoxyalkyl group, e.g., β-methoxyethyl, ω-butoxybutyl, etc., a carboxyalkyl group, e.g., β-carboxyethyl, ω-carboxybutyl, etc.; a sulfoalkyl group, e.g., β-sulfoethyl, ω-sulfobutyl, etc., a sulfatoalkyl group, e.g., β-sulfatoethyl, ω-sulfatobutyl, etc., an acyloxyalkyl group, e.g., β-acetoxyethyl, γ-acetoxypropyl, ω-butyryloxybutyl, etc., an alkoxycarbonylalkyl group, e.g., β-methoxycarbonylethyl, ω-ethoxycarbonylbutyl, etc., or an aralkyl group, e.g., benzyl, phenethyl, etc. The alkyl or aryl group may be substituted by one or more of the substituents on the above-described substituted alkyl groups. In a preferred embodiment, at least one and preferably both of $R_1$ and $R_2$ are substituted with acid salt substituents (e.g., sulfo), as this tends to even further reduce post-processing retained dye stain.

R represents H, substituted or unsubstituted alkyl (preferably lower alkyl of 1 to 6 carbon atoms, e.g., methyl, ethyl) or substituted or unsubstituted aryl (e.g., phenyl). In a preferred embodiment, R is ethyl. This is because one of the advantages provided by the dyes of formula (I) is that they can be chosen so as to J-aggregate, while providing lower retained dye stain than prior art J-aggregating dyes such as 5-chloro-substituted dyes. Dyes according to formula (I) where R is ethyl tend to J-aggregate, and thus, R is preferably ethyl.

$R_3$ represents a substituted or unsubstituted aromatic ring that is fused with or appended to $Z_1$. Examples of aromatic rings that may be appended to $Z_1$ include substituted or unsubstituted phenyl, substituted or unsubstituted pyridyl, thienyl, pyrrole, furanyl, or styryl. Substituents for these $R_3$ groups include hydroxy, alkoxy, aryloxy, alkyl, halogen, cyano, and the like. In a preferred embodiment, $R_3$ is appended to the 5-position of the $Z_1$ ring structure or fused with the 4,5-positions of the $Z_1$ ring structure.

X represents a counterion as necessary to balance the charge of the dye molecule. The counterion may be ionically complexed to the molecule or it may be part of the dye molecule itself to form an intramolecular salt. Such counterions are well-known in the art. For example, when X is an anion (e.g., when $R_1$ and $R_2$ are unsubstituted alkyl), examples of X include chloride, bromide, iodide, p-toluene sulfonate, methane sulfonate, methyl sulfate, ethyl sulfate, perchlorate, and the like. When X is a cation (e.g., when $R_1$ and $R_2$ are both sulfoalkyl or carboxyalkyl), examples of X include sodium, potassium, triethylammonium, and the like.

In one embodiment of the invention, dyes of the following formula within formula (I) are used:

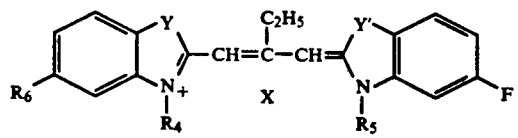

wherein Y and Y' each independently represents O, S, or Se, $R_4$ and $R_5$ each independently represents alkyl substituted with an acid or acid salt group, $R_6$ represents an aryl group that may be appended to or fused with the ring to which it is attached, and X is a counterion as needed to balance the charge of the molecule.

Examples of dyes according to formula (I) are set forth below.

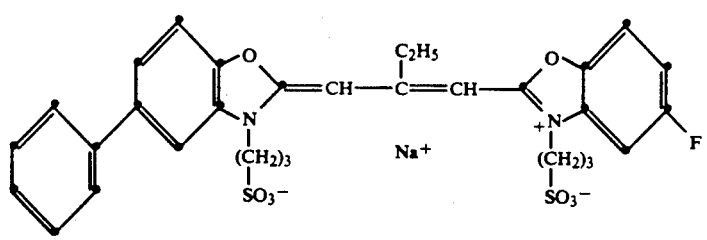
(1)
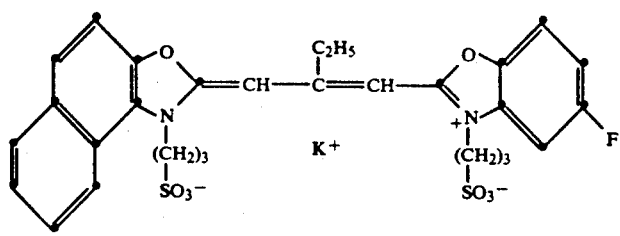
(2)
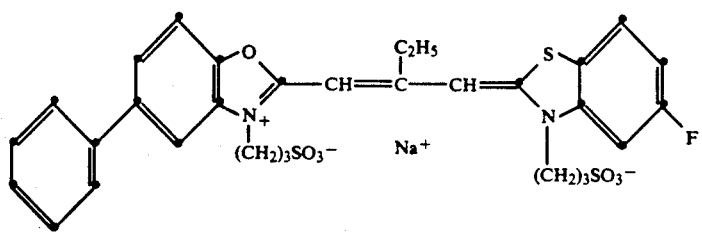
(3)
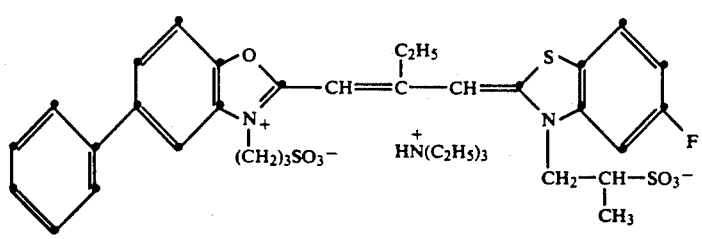
(4)
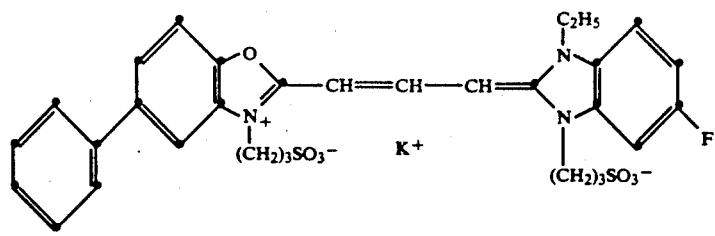
(5)
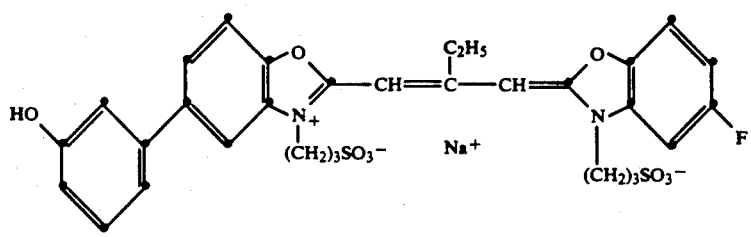
(6)

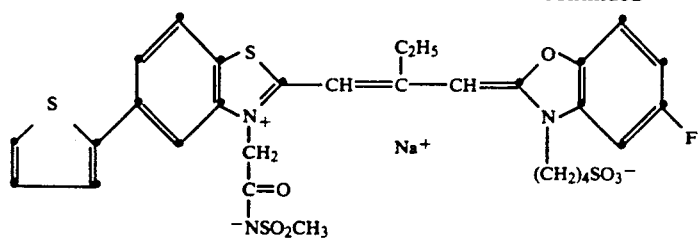
(7)
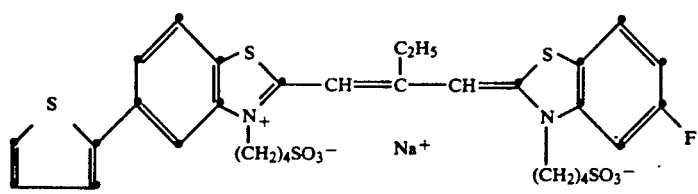
(8)
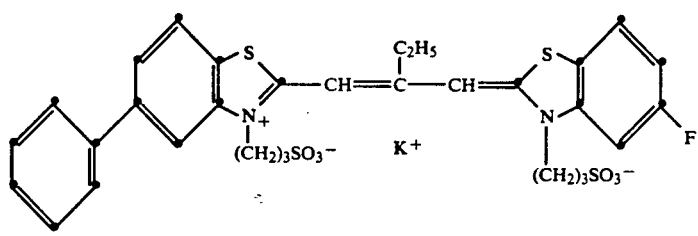
(9)
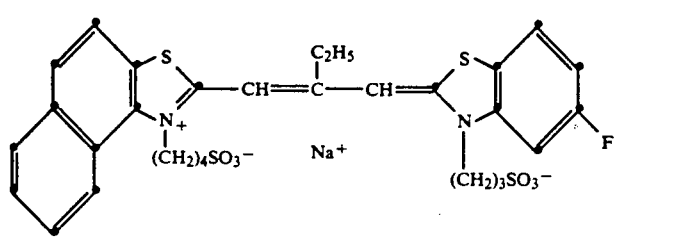
(10)
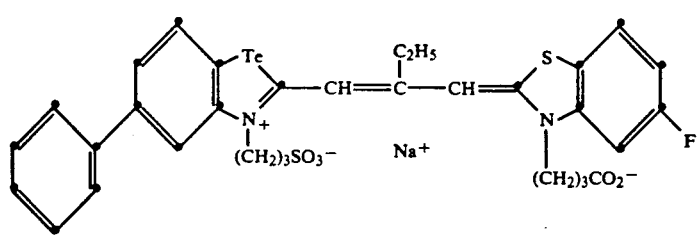
(11)
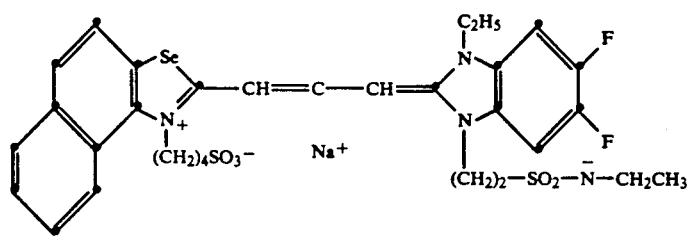
(12)
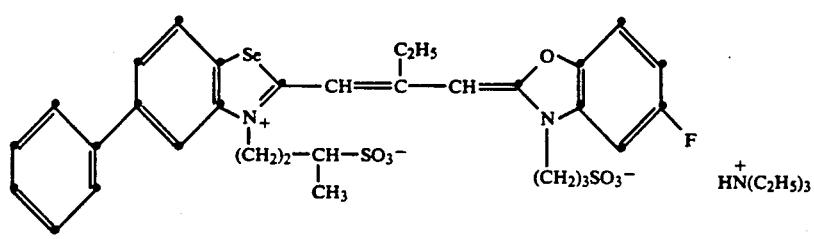
(13)

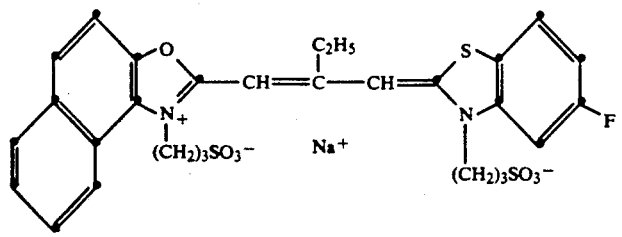
(14)

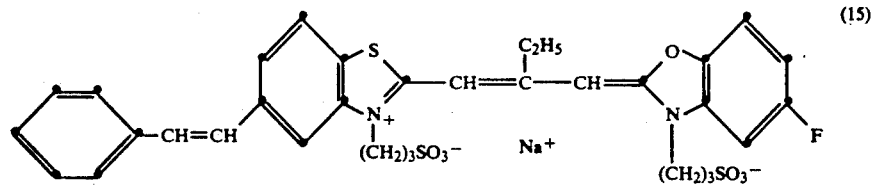
(15)

The amount of sensitizing dye of formula (I) that is useful in the invention is preferably in the range of 0.1 to 1.0 millimoles per mole of silver halide and more preferably from 0.2 to 0.7 millimoles per mole of silver halide. Optimum dye concentrations can be determined by methods known in the art.

The dyes of formula (I) can be synthesized by techniques known in the art, such as described in Hamer, *Cyanine Dyes and Related Compounds*, 1964 and James, *The Theory of the Photographic Process* 4th, 1977. The synthesis of a representative dyes of formula (I) is set forth in the Examples below.

The silver halide that can be sensitized by the dye of formula (I) can be of any known type, such as silver bromoiodide, silver bromide, silver chloride, silver chlorobromide, and the like. In a preferred embodiment, the dye is used to sensitize silver halide emulsions that are high in chloride, preferably above about 80 mole percent and more preferably above about 95 mole percent. Such high-chloride emulsions are often subjected to rapid processing, which further increases the need for low-staining dyes.

The type of silver halide grain used in the invention is not critical and essentially any type of silver halide grains can be used in the practice of the invention, although since the dye is lower stain than prior art aggregating dyes, it may be advantageously used in combination with tabular grain emulsions, which have greater surface area, allowing for greater amounts of dye to be used. The grain size of the silver halide may have any distribution known to be useful in photographic compositions, and may be either polydisperse or monodisperse. The mean grain diameter is preferably from 0.05 μm to 1.5 μm.

The silver halide grains to be used in the invention may be prepared according to methods known in the art, such as those described in *Research Disclosure*, Item 308119, December, 1989 [hereinafter referred to as *Research Disclosure I*] and Mees, *The Theory of the Photographic Process*. These include methods such as ammoniacal emulsion making, neutral or acid emulsion making, and others known in the art. These methods generally involve mixing a water soluble silver salt with a water soluble halide salt in the presence of a protective colloid, and controlling the temperature, pAg, pH values, etc, at suitable values during formation of the silver halide by precipitation.

The silver halide to be used in the invention may be advantageously subjected to chemical sensitization with compounds such as gold sensitizers (e.g., aurous sulfide) and others known in the art. Compounds and techniques useful for chemical sensitization of silver halide are known in the art and described in *Research Disclosure I* and the references cited therein.

The silver halide may be sensitized by the dye of formula (I) by any method known in the art, such as described in *Research Disclosure I*. The dye may added to an emulsion of the silver halide grains and a hydrophilic colloid at any time prior to (e.g., during or after chemical sensitization) or simultaneous with the coating of the emulsion on a photographic element. The dye/silver halide emulsion may be mixed with a dispersion of color image-forming coupler immediately before coating or in advance of coating (e.g., 2 hours).

The dye of formula (I) may be used by itself to sensitize silver halide, or it may be used in combination with other sensitizing dyes to provide the silver halide with sensitivity to broader or different ranges of wavelengths of light than silver halide sensitized with a single dye, or to in a supersensitizing combination with other sensitizing dyes.

In a preferred embodiment of the invention, the dye of formula (I) is used to sensitize silver halide in photographic emulsions, which can be coated as layers on photographic elements. Essentially any type of emulsion (e.g., negative-working emulsions such as surface-sensitive emulsions or unfogged internal latent image-forming emulsions, direct-positive emulsions such as surface fogged emulsions, or others described in, for example, *Research Disclosure I*.

Photographic emulsions generally include a vehicle for coating the emulsion as a layer of a photographic element. Useful vehicles include both naturally occurring substances such as proteins, protein derivatives, cellulose derivatives (e.g., cellulose esters), gelatin (e.g., alkali-treated gelatin such as cattle bone or hide gelatin, or acid treated gelatin such as pigskin gelatin), gelatin derivatives (e.g., acetylated gelatin, phthalated gelatin, and the like), and others as described in *Research Disclosure I*. Also useful as vehicles or vehicle extenders are hydrophilic water-permeable colloids. These include synthetic polymeric peptizers, carriers, and/or binders such as poly(vinyl alcohol), poly(vinyl lactams), acrylamide polymers, polyvinyl acetals, polymers of alkyl and sulfoalkyl acrylates and methacrylates, hydrolyzed polyvinyl acetates, polyamides, polyvinyl pyridine, methacrylamide copolymers, and the like, as described in *Research Disclosure I*. The vehicle can be present in the emulsion in any amount known to be useful in photographic emulsions.

The emulsion can also include any of the addenda known to be useful in photographic emulsions. These include chemical sensitizers, such as active gelatin, sulfur, selenium, tellurium, gold, platinum, palladium, iridium, osmium, rhenium, phosphorous, or combinations thereof. Chemical sensitization is generally carried out at pAg levels of from 5 to 10, pH levels of from 5 to 8, and temperatures of from 30° to 80° C., as illustrated in Research Disclosure, June, 1975, item 13452 and U.S. Pat. No. 3,772,031.

Other addenda include antifoggants, stabilizers, filter dyes, light absorbing or reflecting pigments, vehicle hardeners such as gelatin hardeners, coating aids, dye-forming couplers, and development modifiers such as development inhibitor releasing couplers, timed development inhibitor releasing couplers, and bleach accelerators. These addenda and methods of their inclusion in emulsion and other photographic layers are well-known in the art and are disclosed in *Research Disclosure I* and the references cited therein.

The emulsion may also include brighteners, such as stilbene brighteners. Alternatively, such brighteners may be contained in processing solutions. Such brighteners are well-known in the art and are used to counteract dye stain, although the dyes of formula (I) offer reduced dye stain even if no brightener is used.

The emulsion layer containing silver halide sensitized with the dye of formula (I) can be coated simultaneously or sequentially with other emulsion layers, subbing layers, filter dye layers, interlayers, or overcoat layers, all of which may contain various addenda known to be included in photographic elements. These include antifoggants, oxidized developer scavengers, DIR couplers, antistatic agents, optical brighteners, light-absorbing or light-scattering pigments, and the like.

The layers of the photographic element can be coated onto a support using techniques well-known in the art. These techniques include immersion or dip coating, roller coating, reverse roll coating, air knife coating, doctor blade coating, stretch-flow coating, and curtain coating, to name a few. The coated layers of the element may be chill-set or dried, or both. Drying may be accelerated by known techniques such as conduction, convection, radiation heating, or a combination thereof.

Photographic elements comprising the composition of the invention can be black and white or color. A color photographic element generally contains three silver emulsion layers or sets of layers: a blue-sensitive layer having a yellow color coupler associated therewith, a green-sensitive layer having a magenta color coupler associated therewith, and a red-sensitive layer having a cyan color coupler associated therewith. The dye of formula (I) is advantageously utilized in a green-sensitive layer of a color photographic element having a magenta dye-forming color coupler associated therewith. Any of the known magenta couplers, such as the one shown in the example below (or, alternatively the coupler shown in the example, but having a substituent other than hydrogen at the coupling-off position of the pyrazolone ring) may be used. Alternatively, the dyes of formula (I) may be red sensitizing dyes utilized in a red-sensitive layer of a color photographic element having a cyan dye-forming coupler associated therewith. These color image-forming couplers along with other element configurations are well-known in the art and are disclosed, for example, in *Research Disclosure I*.

Photographic elements comprising the composition of the invention can be processed in any of a number of well-known photographic processes utilizing any of a number of well-known processing compositions, described, for example, in *Research Disclosure I* or in James, *The Theory of the Photographic Process* 4th, 1977. Elements having high chloride silver halide photographic compositions are especially advantageously processed by fast processes utilizing a so-called rapid access developer, as described in the Photographic Examples below.

The invention is described further in the following Examples.

SYNTHESIS EXAMPLE 1

Preparation of Dye 2

1 g of a compound having the formula:

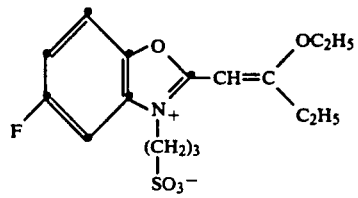

and 1 g of a compound having the formula:

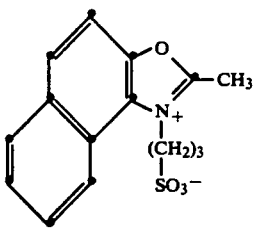

were mixed in 5 ml m-cresol and heated to 120° C. Triethylamine (5 ml) was added with stirring. After 5 minutes, the mixture was cooled and poured into ether. The mixture was washed three times with ether, and the oil was dissolved in 20 ml $CH_3CN$. Water (3 ml) containing 0.4 g potassium acetate was added, causing the dye to precipitate. The mixture was heated to reflux, and then chilled. The precipitate was collected and purified with an HPLC column using a mixture of $H_2O$ and $CH_3CN$. λ-max (methanol)=506 nm, ε-max=$12.7 \times 10^4$.

Photographic Examples

Dye 1 and a comparison dye having the structure:

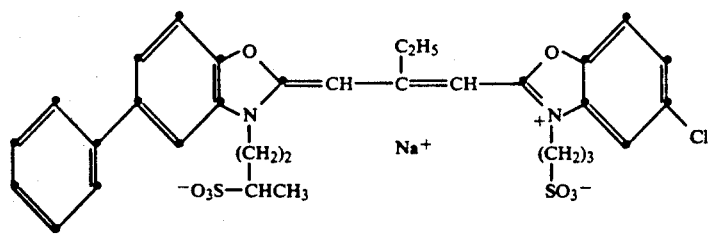

were used to sensitize a silver halide emulsion. The emulsion was an aurous sulfide sensitized 0.31 μm silver chloride emulsion having the following coverages on a polyester support.

| | |
|---|---|
| silver | 280 mg/m² |
| gelatin | 1.66 g/m² |
| 1-(3-acetamidophenyl)-5-mercaptotetrazole | 380 mg/mole Ag |
| KBr | 63.6 mg/mole Ag |
| KCl | 8.1 g/mole Ag |
| magenta coupler | 448 mg/m² |

The magenta coupler had the structure:

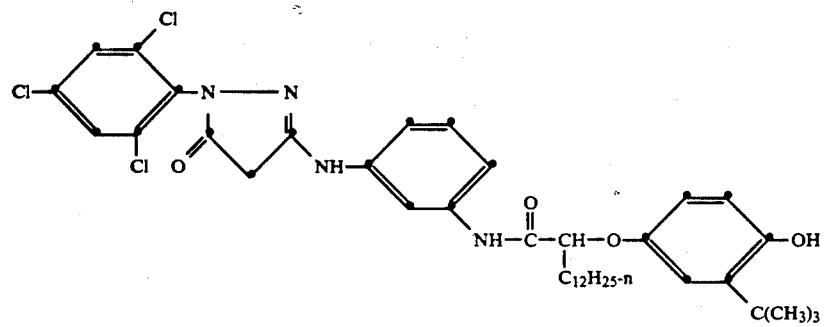

The coupler dispersion was added to the dye/silver chloride emulsion immediately before coating. The elements also included a gelatin overcoat layer (1.08 g/m²) and a gelatin undercoat layer (1.08 g/m²) above and below the emulsion layer. To evaluate photographic sensitivity, the elements were exposed to a 3000° K. tungsten light source with ultraviolet and heat-absorbing filters, and processed as described below. For retained dye stain evaluation, identical but unexposed elements were subjected to the same processing, and the optical density at 510 nm was measured.

| | |
|---|---|
| Process: | |
| 40 sec in developer | |
| 5 sec drain | |
| 45 sec Kodak Ektaprint2 ® blix | |
| 3 min wash | |
| dry | |
| Developer composition: | |
| p-phenylenediamine developing agent | 5.0 g |
| sulfonated polystyrene | 0.25 ml |
| triethanolamine | 11.0 ml |
| diethylhydroxylamine (85%) | 6.0 ml |
| lithium sulfate | 2.7 g |
| anti-calcium agent | 0.8 ml |
| potassium chloride | 1.6 g |
| potassium bromide | 10.0 mg |
| potassium carbonate | 25.0 g |
| water to make | 1.0 l |
| adjust pH to 10.0 | |

The photographic speeds and retained dye stain measurements are presented in Table I below. The dye level is presented as a fraction times the base level of $4.75 \times 10^{-4}$ mmol/mole Ag.

TABLE I

| Dye | Level | White Light Speed | Dye Stain (density) |
|---|---|---|---|
| A | 0.7X | 175 | 0.023 |
| A | 0.85X | 185 | 0.028 |
| A | 1.0X | 182 | 0.029 |
| A | 1.15X | 190 | 0.033 |
| 1 | 0.7X | 174 | 0.012 |
| 1 | 0.85X | 179 | 0.013 |
| 1 | 1.0X | 181 | 0.017 |
| 1 | 1.15X | 183 | 0.018 |

The data presented in Table I demonstrate that the dye of formula (I) provided comparable photographic speed as the comparison dye, but with significantly less retained dye stain.

The invention has been described in detail with particular reference to preferred embodiments thereof, but it will be understood that variations and modifications can be effected within the spirit and scope of the invention.

What is claimed is:

1. A photographic element comprising a support having thereon at least one silver halide emulsion layer comprising silver halide spectrally sensitized with a dye having the formula:

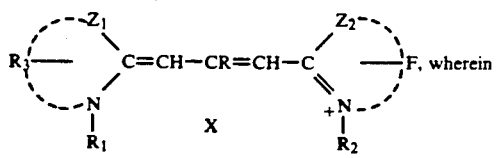

wherein $Z_1$ represents the atoms necessary to complete a benzoxazole nucleus, a benzothiazole nucleus, or a benzoselenazole nucleus, which, in addition to being substituted by $R_3$, may be further substituted or unsubstituted, $Z_2$ represents the atoms necessary to complete a benzoxazole nucleus, a benzothiazole nucleus, or a benzoselenazole nucleus, which, in addition to being substituted by F, may be further substituted or unsubstituted, R represents H or substituted or unsubstituted alkyl or aryl, $R_1$ and $R_2$ each independently represents substituted or unsubstituted alkyl or aryl, $R_3$ represents an aryl group that may be appended to or fused with the nuclei completed by $Z_1$, and X is a counterion as needed to balance the charge of the molecule.

2. A photographic element according to claim 1 wherein R is ethyl.

3. A photographic element according to either of claims 1 or 2 wherein $R_3$ is an aryl group appended to the 5-position of the $Z_1$ nucleus.

4. A photographic element according to claim 1 or 3 wherein $R_3$ represents an aryl group fused with the $Z_1$ nucleus to form a substituted or unsubstituted: naphtho[1,2-d]oxazole nucleus, naphtho[1,2-d]thiazole nucleus, or naphtho[1,2-d]selenazole nucleus.

5. A photographic element according to either of claim 1 or 2 wherein F is appended to the 5-position of the $Z_2$ nucleus.

6. A photographic element according to claim 3 wherein F is appended to the 5-position of the $Z_2$ nucleus.

7. A photographic element according to either of claim 1 or 2 wherein at least one of $R_1$ and $R_2$ are alkyl substituted with an acid or acid salt group.

8. A photographic element according to claim 3 wherein at least one of $R_1$ and $R_2$ are alkyl substituted with an acid or acid salt group.

9. A photographic element according to either of claim 1 or 2 wherein both of $R_1$ and $R_2$ are alkyl substituted with an acid or acid salt group.

10. A photographic element according to claim 3 wherein both of $R_1$ and $R_2$ are alkyl substituted with an acid or acid salt group.

11. A photographic element according to claim 5 wherein both of $R_1$ and $R_2$ are alkyl substituted with an acid or acid salt group.

12. A photographic element according to claim 6 wherein both of $R_1$ and $R_2$ are alkyl substituted with an acid or acid salt group.

13. A photographic element according to claim 1 wherein the dye has the formula:

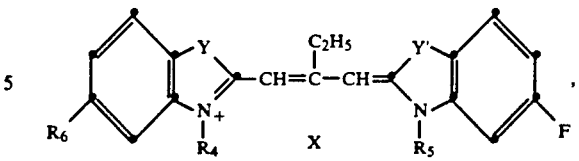

wherein

Y and Y' each independently represents O, S, or Se, $R_4$ and $R_5$ each independently represents alkyl substituted with an acid or acid salt group, $R_6$ represents an aryl group that may be appended to or fused with the ring to which it is attached, and X is a counterion as needed to balance the charge of the molecule.

14. A photographic element according to claim 4 wherein F is appended to the 5-position of the $Z_2$ nucleus.

15. A photographic element according to claim 1 wherein the silver halide comprises above about 80 mole percent silver halide.

16. A photographic element according to claim 15 wherein the silver halide comprises above about 95 mole percent silver halide.

17. A photographic element according to claim 13 wherein the silver halide comprises above about 80 mole percent silver halide.

18. A photographic element according to claim 17 wherein the silver halide comprises above about 95 mole percent silver halide.

19. A photographic element comprising a support having thereon at least one silver halide emulsion layer comprising silver halide spectrally sensitized with a dye having the formula:

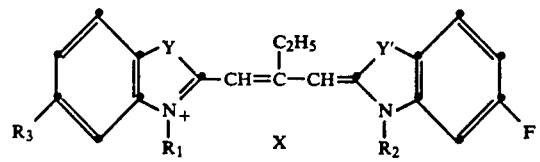

wherein

Y and Y' each independently represents O, S, or Se, $R_1$ and $R_2$ each independently represents substituted or unsubstituted alkyl or aryl, $R_3$ represents an aryl group that may be appended to or fused with the ring to which it is attached, and X is a counterion as needed to balance the charge of the molecule.

20. A photographic element according to claim 19 wherein at least one of $R_1$ and $R_2$ is alkyl substituted with an acid or acid salt group.

21. A photographic element according to claim 19 wherein the silver halide comprises above about 80 mole percent silver halide.

22. A photographic element according to claim 21 wherein the silver halide comprises above about 95 mole percent silver halide.

* * * * *